(12) United States Patent
Spurlock

(10) Patent No.: US 9,695,071 B2
(45) Date of Patent: Jul. 4, 2017

(54) METHOD FOR TREATING MINERAL SLURRIES WITH A BIOCIDE

(71) Applicant: Bulk Chemical Services, LLC., Atlanta, GA (US)

(72) Inventor: Seth Spurlock, Atlanta, GA (US)

(73) Assignee: BULK CHEMICAL SERVICES, LLC., Marietta, GA (US)

( * ) Notice: Subject to any disclaimer, the term of this patent is extended or adjusted under 35 U.S.C. 154(b) by 0 days.

(21) Appl. No.: 15/205,266

(22) Filed: Jul. 8, 2016

(65) Prior Publication Data

US 2017/0000130 A1 Jan. 5, 2017

Related U.S. Application Data

(62) Division of application No. 14/755,185, filed on Jun. 30, 2015.

(51) Int. Cl.
| | | |
|---|---|---|
| *A01N 47/14* | (2006.01) |
| *C09J 103/02* | (2006.01) |
| *C09J 129/04* | (2006.01) |
| *C08K 5/39* | (2006.01) |
| *C08K 3/36* | (2006.01) |
| *C09D 5/14* | (2006.01) |
| *C09J 103/04* | (2006.01) |
| *C02F 1/50* | (2006.01) |
| *C09J 11/06* | (2006.01) |
| *C09K 8/035* | (2006.01) |
| *C09K 8/68* | (2006.01) |
| *C09K 8/60* | (2006.01) |
| *C02F 103/10* | (2006.01) |

(52) U.S. Cl.
CPC ............. *C02F 1/50* (2013.01); *C08K 3/36* (2013.01); *C08K 5/39* (2013.01); *C09D 5/14* (2013.01); *C09J 11/06* (2013.01); *C09J 103/02* (2013.01); *C09J 103/04* (2013.01); *C09J 129/04* (2013.01); *C09K 8/035* (2013.01); *C09K 8/605* (2013.01); *C09K 8/68* (2013.01); *C02F 2103/10* (2013.01); *C02F 2303/04* (2013.01)

(58) Field of Classification Search
CPC .. A01N 47/14; C08K 3/36; C08K 5/39; C09J 103/02; C09J 103/04; C09J 129/04; C09D 5/14
USPC ........................................................ 514/487
See application file for complete search history.

(56) References Cited

U.S. PATENT DOCUMENTS

| | | |
|---|---|---|
| 2,929,758 A | 3/1960 | Buckman et al. |
| 3,084,095 A | 4/1963 | Boogaart et al. |
| 3,198,733 A | 8/1965 | Pera et al. |
| 3,282,715 A | 11/1966 | Sawyer, Jr. et al. |
| 3,519,454 A | 7/1970 | Sawyer, Jr. et al. |
| 3,699,231 A | 10/1972 | Werlein et al. |
| 3,856,851 A | 12/1974 | Buckman et al. |
| 3,973,034 A | 8/1976 | Buckman et al. |
| 4,315,846 A | 2/1982 | Kuchikata et al. |
| 4,400,298 A | 8/1983 | Boocock et al. |
| 4,495,200 A | 1/1985 | Lindstrom et al. |
| 4,684,469 A | 8/1987 | Pedersen et al. |
| 4,997,550 A | 3/1991 | Cobb et al. |
| 5,158,596 A | 10/1992 | Sherba et al. |
| 5,209,824 A | 5/1993 | La Zonby |
| 5,322,834 A | 6/1994 | Hsu |
| 5,457,083 A | 10/1995 | Muia et al. |
| 5,496,398 A | 3/1996 | Drew et al. |
| 5,647,895 A | 7/1997 | Drew et al. |
| 5,756,526 A | 5/1998 | Williams et al. |
| 6,770,677 B2 | 8/2004 | Carlson et al. |
| 7,008,545 B2 | 3/2006 | Cronan, Jr. et al. |
| 7,611,575 B2 | 11/2009 | Sare et al. |
| 7,767,010 B2 | 8/2010 | Curzon et al. |
| 8,632,794 B2 | 1/2014 | Barak |
| 8,652,496 B2 | 2/2014 | Barak |
| 8,758,562 B2 | 6/2014 | Krapsch et al. |
| 2004/0237845 A1 | 12/2004 | Hunton |
| 2006/0040122 A1 | 2/2006 | Carlson et al. |
| 2008/0009532 A1 | 1/2008 | Wachtler |
| 2011/0097311 A1 | 4/2011 | Di Maiuta et al. |
| 2013/0029884 A1 | 1/2013 | Malchesky et al. |
| 2013/0150239 A1 | 6/2013 | Premachandran et al. |
| 2014/0088190 A1 | 3/2014 | McNeel et al. |
| 2014/0303045 A1 | 10/2014 | Campbell et al. |

FOREIGN PATENT DOCUMENTS

| | | |
|---|---|---|
| DE | 289055 | 4/1991 |
| EP | 0 386 509 | 9/1990 |
| EP | 0 685 158 | 12/1995 |
| JP | 01-268757 | 10/1989 |
| KR | 2011-0026316 | 3/2011 |
| WO | 2014/190226 | 11/2014 |

*Primary Examiner* — Kristin Vajda

(74) *Attorney, Agent, or Firm* — Clark & Brody

(57) ABSTRACT

A method of treating mineral slurries to inhibit bacterial growth includes adding an effective amount of one or more of sodium N-methyldithiocarbamate or methylammonium monomethyldithiocarbamate to the mineral slurry to inhibit bacterial growth.

12 Claims, No Drawings

METHOD FOR TREATING MINERAL SLURRIES WITH A BIOCIDE

This application is a Divisional of U.S. Ser. No. 14/755,185 filed on Jun. 30, 2015.

FIELD OF THE INVENTION

The invention relates to the treatment of mineral slurries with a biocide, and in particular, to a treatment using an effective amount of one or both of sodium N-methyldithiocarbamate and methylammomonium monomethyldithiocarbamate in the mineral slurry to inhibit bacterial growth.

BACKGROUND ART

The use of biocides in mineral slurries is well known. Biocides are used in mineral slurries to inhibit bacterial growth. Typically, biocides are added both during the manufacturing process and as preservatives in the final product. The product selection and dosage is normally based on extensive laboratory analysis to measure product efficacy and interactions with other slurry components. Additionally, regulatory, safety and customer requirements also impact the choice of biocide.

There are a limited number of biocides with the appropriate EPA and FDA clearances for use in mineral slurries to inhibit bacteria growth. These products primarily include glutaraldehyde (Glute), 1,2 benzithiazolin-3-one (BIT), tetrahydro-3-5-methyl-2H-1,3,5-thiadizine-2-thione (thione or dazomet), isothiazoline (Iso), bronopol (BNPD), orthophenyl phenate (OPP), or 2,2-dibromo-3-nitrilopropionarnide (DBNPA).

A particular one of these biocides is sold under the name BCS 3243which is tetrahydro-3,5-dimethyl-2H-1,3,5-thiadiazine-2-thione, which is also known in the industry as thione or dazomet (hereinafter thione) CAS #53-74-4 and EPA Reg. No. 1448-103-82760. This material is designed to preserve clay slurries, adhesives, coatings and high viscosity suspensions. Thione is sold in dry, caustic based solution and water based emulsion forms. For preservation of slurries and high viscosity suspensions, thione is typically added at a point in the processing system where there will be sufficient time and agitation for good mixing and dispersion. Preferred amounts are at levels of 0.04-0.45%, by weight, based on the total formulation in slurries of kaolin, starch, clay, calcium carbonate, or titanium dioxide. Thione also has applications in paper coatings; high viscosity suspensions (e.g., polymers, silica-polymer combinations); polyvinyl alcohol/polyvinyl acetate-based adhesives; starch-based adhesives; in oilfield applications and dextrin-based adhesives. The exact amount of material to be added for the preservation of any given formulation will depend on the components and local storage time and conditions. Dosage rates are normally determined by actual tests.

These known biocides have numerous limitations as they can be sensitive to slurry pH and temperature, they can impact quality, they have odor and can have high VOC's, the efficacy can be insufficient, and they can be expensive. Glutaraldehyde can be problematic because it is hazardous to handle and has environmental concerns. Moreover, it contains aldehydes, is the least cost efficient biocide, and is odiferous. BIT and ISO are also limited in applications based on slurry pH, interactions with other slurry components, and temperature. Bronopol is susceptible to high process temperatures, pH, and interaction with slurry components. Thione is a good broad spectrum biocide and is versatile but has limited application because it creates odor and has other health and safety issues due to the presence of formaldehyde.

There is a need for additional and more versatile biocides to address changing slurry formulations, regulatory constraints, slurry interactions, efficacy, odor, and be able to mitigate many of these problems.

SUMMARY OF THE INVENTION

One object of the invention is the treatment of mineral slurries with biocides.

Another object of the invention is the treatment of mineral slurries without having to use a biocide that has formaldehyde.

Another object of the invention is the use of biocides in applications related to oil fields.

In satisfaction of the objects and in one aspect, the invention is an improvement in the known method of treating a mineral slurry with a biocide to inhibit bacterial growth. The improvement is adding an effective amount of one or more of sodium N-methyldithiocarbamate or methylammonium monomethyldithiocarbamate to the mineral slurry to inhibit bacterial growth.

The effective amount further comprises up to 0.45% by weight, based on the total formulation in slurries, with preferred ranges being 500-1500 ppm in the slurry being treated.

The mineral slurry can be any known type that is typically treated with biocides, including but not limited to slurries containing water and one or more of a kaolin, starch, a clay, calcium carbonate, or titanium dioxide. The clay can be a kaolin clay and the calcium carbonate can be a ground type or precipitated calcium carbonate. The water can be fresh water or reclaimed water.

The inventive method can include the combination of the one or more of sodium N-methyldithiocarbamate or methylammonium monomethyldithiocarbamate and an effective amount of another biocide selected from the group consisting of glutaraldehyde, 1,2 benzithiazolin-3-one, tetrahydro-3-5-methyl-2H-1,3,5-thiadizine-2-thione, isothiazoline, bronopol, 2,2-dibromo-3-nitrilopropionamide, and orthophenyl phenate.

The invention is also an improvement in the treating of water used in oil field applications, wherein methylammonium monomethyldithiocarbamate can be used as an effective biocide in these types of applications. The inventive method in this aspect encompasses any oil field application involving water and the need for a biocide. Examples of such oil field applications where biocide treatment of water would be required include oil well drilling with oil field drilling muds, well stimulation, fracturing fluids, oil field processing applications, oil field water treatment systems, oil and gas productions and transmission pipelines and systems, gas storage fields and equipment; such as steam-injection water holding tanks, flood water, injection water, holding pond water, disposal-well water, water holding tanks, fuel storage tanks and related refinery and oil field closed, industrial recirculating water handling and the like.

The concentrations used in will vary depending on water and bacteria concentration. Routine laboratory testing and procedures are readily available to determine the minimum quantities necessary whereas the maximum dosages are normally regulated by economics.

The invention is also an improvement in methods of treating adhesives, coatings, and high viscosity suspensions to inhibit bacterial growth by adding an effective amount of a biocide to the coatings, adhesives, and high viscosity suspensions. The improvement comprises comprising adding an effective amount of one or more of sodium or potassium N-methyldithiocarbamate and methylammonium monomethyldithiocarbamate to one or more of the coatings, adhesives, and high viscosity suspensions to inhibit bacterial growth. The effective amount can comprise 200-4500 ppm weight based on the total formulation. An additional biocide can be used in connection with this application, these additional biocides including glutaraldehyde, tetrahydro-3-5-methyl-2H-1,3,5-thiadizine-2-thione, 2,2-dibromo-3-nitrilopropionamide, bronopol, orthophenyl phenate, or tetrakis-hydoxymethyly-phosphonium sulfate (THPS).

DETAILED DESCRIPTION OF THE INVENTION

The invention provides a significant improvement in the treatment of mineral slurries with a biocide through the use of an effective amount of one or both of sodium N-methyldithiocarbamate and methylammonium monomethyldithiocarbamate. Hereinafter, sodium N-methyldithiocarbamate and methylammonium monomethyldithiocarbamate are referred to as metam sodium and MDTCMA, respectively, for simplicity.

The use of either metam sodium or MDTCMA provides a significant advantage in the field of treating mineral slurries with biocides and the invention addresses a number of problem issues in mineral slurry preservation. Both metam sodium and MDTCMA produce the break-down component methylisothiocyanate (MITC), which provides the efficacy of the biocide. MITC is also the break-down component in thione. Therefore, metam sodium or MDTCMA work just as well as the thione biocide from an efficacy standpoint. More importantly, metam sodium and MDTCMA do not contain formaldehyde or other aldehydes. In essence, using either metam sodium or MDTCMA represents a non-formaldehyde based microbiocide chemistry for preserving mineral slurries. The inventive method can also be characterized as employing a non-oxidizing or non-halogenated based chemistry whose antimicrobial activity is not based on producing aldehyde or formaldehydes. Without these presence of these harmful components in thione, the use of metam sodium or MDTCMA as a biocide permits a broader use in mineral slurry preservations. Essentially metam sodium and MDTCMA provide the efficacy of thione without the odor or safety issues of thione. Both metam sodium and MDTCMA are cost effective alternatives to existing approved mineral slurry biocides.

The concentration of metam sodium or MDTCMA in a given slurry will depend on a number of factors. Broadly, the amount of either metam sodium or MDTCMA for a given slurry should be an amount that will be effective to inhibit bacterial growth in the selected mineral slurry. Examples of such amounts include a concentration range of up to 0.04 to 0.45% by weight, with a preferred range of 500-1500 ppm of the biocide in the slurry being treated.

The mineral slurries suitable for treatment with metam sodium and MDTCMA are those that are normally treated with biocides. Examples of these slurries include water containing kaolin, starches, clays, calcium carbonate (both ground and precipitated), and titanium dioxide. These types of slurries are exemplary only and any mineral slurry needing biocidal treatment is a candidate to use metam sodium or MDTCMA as a biocide, either alone or in combination with a known biocide.

Typically, metam sodium is made in an aqueous solution at a concentration range of 27-42%. Metam potassium is also a commercially recognized alternative to the metam sodium and varies primarily in the use of potassium hydroxide versus sodium hydroxide in the manufacturing process. MDTCMA is also available in an aqueous solution in concentrations ranging from 45-50%. Both metam sodium and MDTCMA are available commercially from a number of different sources and their CAS Nos are 137-42-8 and 21160-95-2, respectively.

In use as a biocide for treatment of mineral slurries, the biocides of metam sodium and MDTCMA can be used in the same manner of known biocides such as thione, glute, and the like. One example of use is shown above in connection with thione sold under the name BCS 3243. However, this is only one example of how a biocide is to be used to preserve mineral slurries and any other known ways to employ a biocide in the treatment of a mineral slurry can be used in connection with metam sodium and MDTCMA. U.S. Pat. No. 3,282,715 to Sawyer et al. is an example of using thione in a clay slurry for preservation purposes. U.S. Pat. No. 4,997,550 to Cobb et al. is another example of treating a mineral shiny and adding a biocide prior to the flotation step. Both of these patents are incorporated by reference herein.

The inventive method can include the combination of the one or both of sodium N-methyldithiocarbamate and methylammonium monomethyldithiocarbamate and an effective amount of another biocide selected from the group consisting of glutaraldehyde, 1,2 benzithiazolin-3-one, tetrahydro-3-5-methyl-2H-1,3,5-thiadizine-2-thione, isothiazoline, bronopol, 2,2-dibromo-3-nitrilopropionamide, and orthophenyl phenate.

A number of comparative tests were performed to compare the efficacy of metam sodium and MDTCMA to other biocides. The results of these studies are shown in tabular form in Tables 1-3 and described below In the comparative testing, dry kaolin was mixed with water to achieve a 65% solid slurry material. This material contained no biocide. The slurry was then split into 200 gram aliquots and dosed with different biocides at different concentration as shown in Tables 1-3. All samples were kept at 50° C. until the end of the testing, which was up to 28 days.

A number of different and known biocides were used in the study and they include glutaraldehyde (glute), 1,2 benzithiazolin-3-one (BIT), tetrahydro-3-5-methyl-2H-1,3,5-thiadizine-2-thione (thione), isothiazoline (ISO), bronopol (BNPD) or orthophenyl phenate (OPP). For shorthand purposes, the study refers to the tradename of the biocide, which is found in the above listing of the biocides. Metam sodium is designated as SMDC and MDTCMA is used without change.

The protocol for the testing of each sample is as follows:
1) dosed with a recorded level of biocide;
2) mixed for 24 hours contact time and plated using standard method agar for bacterial growth;
3) remixed daily for 1 hour and retested for bacterial growth at Day 3;
4) remixed daily for 1 hour and retested for bacterial growth at Day 7;
5) remixed daily for 1 hour and retested for bacterial growth at Day 14;
6) on day 20, samples were split into two containers: one container was inoculated (or challenged) with ~$10^5$ cfu/ml bacteria, the other was left "as treated", the challenge material was obtained from a contaminated kaolin product and is assumed to be representative of the types of bacteria that are seen in the kaolin industry, and the two sets of samples were prepared for Day 21 testing;
7) both sets were remixed daily for 1 hour and retested for bacterial growth at Day 21; and
8) both sets remixed daily for 1 hour and retested for bacterial growth at Day 28.

Different contact times were used to see how quickly the bacterial population was effected by the biocide.

Table 1 compares a kaolin/BIT slurry with the biocides of metam sodium or MDTCMA. The concentrations of the biocide in ppm in the sample are shown. The contact time for the biocide and the number of colonies is reported as cfu/ml for the control and the tested biocide. What Table 1 shows is that the biocides of metam sodium or MDTCMA performed at least as well as the BIT biocide at a concentration of 500 ppm when measuring log reduction and was far superior for a concentration of 1000 ppm.

TABLE 1

| | | Contact Time | | | | | |
|---|---|---|---|---|---|---|---|
| | | 1 day | | 3 day | | 7 day | |
| Chemistry | ppm | cfu/mL | Log Red | cfu/mL | Log Red | cfu/mL | Log Red |
| Control | | 35,000,000 | | 56,000,000 | | 39,000,000 | |
| Kathon/BIT Blend | 500 | 11,780,000 | 0 | 1,640,000 | 2 | 100,000 | 3 |
| MDTCMA | 500 | 13,140,000 | 0 | 1,880,000 | 1 | 40,000 | 3 |
| | 1000 | 7,060,000 | 1 | 1,680,000 | 2 | 1,000 | 5 |
| 42% SMDC | 500 | 24,340,000 | 0 | 2,600,000 | 1 | 30,000 | 3 |
| | 1000 | 16,880,000 | 0 | 2,200,000 | 1 | 1,000 | 5 |

Table 2 shows additional comparative testing, which lasted for 28 days. Table 2 again compares the SDMC and MDTCMA used in Table 1 with a different set of biocides, including a combination of ISO and BIT, a combination of ISO and bronopol, glute, and thione. While glutaraldehyde is the best performer in Table 2, this Table also that either SDMC or MDTCMA provides comparable biocide efficacy as compared to known biocides, including thione, particularly at the 1000 ppm level of concentration.

TABLE 2

| | | Contact Time | | | | | | | |
|---|---|---|---|---|---|---|---|---|---|
| | | 1 day | | 3 day | | 7 day | | 14 day | |
| Chemistry | ppm | cfu/mL | Log Red | cfu/mL | Log Red | cfu/mL | Log Red | cfu/mL | Log Red |
| Control | | 21,980,000 | | 26,690,000 | | 44,000,000 | | 53,000,000 | |
| 1.5% ISO + 10% BIT | 400/400 | 18,840,000 | 0 | 86,300 | 2 | 1,400 | 4 | 3,400 | 4 |
| 1.5% ISO + 10% Bronopol | 400/400 | 11,780,000 | 0 | 530,000 | 2 | 6,800 | 4 | 4,200 | 4 |
| 50% Glute | 400 | 100 | 5 | 100 | 5 | 100 | 6 | 100 | 6 |
| 24% Thione | 500 | 13,340,000 | 0 | 11,000 | 3 | 5,600 | 4 | 2,100 | 4 |
| | 1000 | 6,670,000 | 1 | 6,800 | 4 | 2,600 | 4 | 1,200 | 5 |
| MDTCMA | 500 | 18,840,000 | 0 | 1,960,000 | 1 | 5,600 | 4 | 3,100 | 4 |
| | 1000 | 14,520,000 | 0 | 7,000 | 4 | 3,200 | 4 | 2,500 | 4 |
| 42% SMDC | 500 | 19,630,000 | 0 | 780,000 | 2 | 4,000 | 4 | 3,000 | 4 |
| | 1000 | 12,560,000 | 0 | 4,800 | 4 | 2,400 | 4 | 2,600 | 4 |

| | | Contact Time | | | | | | | |
|---|---|---|---|---|---|---|---|---|---|
| | | 21 day | | 21 day Challenge | | 28 day | | 28 day Challenge | |
| Chemistry | ppm | cfu/mL | Log Red | cfu/mL | Log Red | cfu/mL | Log Red | cfu/mL | Log Red |
| Control | | CHALLENGE | | 76,000,000 | | 26,000,000 | | | |
| 1.5% ISO + 10% BIT | 400/400 | 4,000 | 4 | 89,000 | 3 | 3,300 | 4 | 102,000 | 2 |
| 1.5% ISO + 10% Bronopol | 400/400 | 2,900 | 4 | 46,000 | 3 | 2,200 | 4 | 58,000 | 3 |
| 50% Glute | 400 | 100 | 6 | 100 | 6 | 100 | 5 | 100 | 5 |
| 24% Thione | 500 | 1,100 | 5 | 39,000 | 3 | 800 | 5 | 3,400 | 4 |
| | 1000 | 300 | 5 | 900 | 5 | 200 | 5 | 1,500 | 4 |
| MDTCMA | 500 | 1,800 | 5 | 73,000 | 3 | 2,500 | 4 | 65,000 | 3 |
| | 1000 | 1,100 | 5 | 52,000 | 3 | 1,700 | 4 | 32,000 | 3 |
| 42% SMDC | 500 | 1,800 | 5 | 105,000 | 3 | 1,800 | 4 | 16,000 | 3 |
| | 1000 | 900 | 5 | 59,000 | 3 | 900 | 4 | 16,000 | 3 |

Note:
Day 20 - Samples split into two aliquots and one aliquot challenged with 100,000 cfu/ml Table 3 shows another series of comparisons, primarily between thione and SDMC and MDTCMA. Here, the concentrations of the SDMC and MDTCMA were increased to 1000 and 1500 ppm as compared to the 500-1000 ppm used in Tables 1 and 2. Up to the 28 day testing (not challenge testing), the SDMC and MDTCMA performed on a par with the thione for biocide effectiveness. For the challenge testing, MDTCMA still performed adequately but under these conditions, SDMC was comparable to thione and also the superior biocide as between SDMC and MDTCMA.

Table 3 uses SDMC and MDTCMA in lower amounts (500 ppm) in combination with other biocides. This testing reveals that the use of the lower amounts of SDMC and MDTCMA in combination with the known biocides produces a comparable biocide effectiveness as compared to the SDMC and MDTCMA used alone and in higher concentrations. However, the combination of the SDMC and MDTCMA with other biocides does not seem to show any synergistic effect.

is the case with thione. Therefore, both MDTCMA and SMDC are viable candidates for use as a biocide in the treatment of mineral slurries, for example, the kaolin or calcium carbonate industries, with metam sodium providing a slightly better biocide effectiveness than MDTCMA based on the studies discussed above.

It should be understood that metam potassium, i.e., potassium N-methyldithiocarbamate, would be expected to provide the same biocidal efficacy as sodium N-methyldithiocarbamate and in the same concentrations as disclosed for sodium N-methyldithiocarbamate in the applications disclosed herein. As such, metam potassium can be used with or in place of metam sodium or MDTCMA in biocide applications. These compounds can be referred to as sodium or potassium N-methyldithiocarbamate or metam sodium/potassium.

While MDTCMA has been shown to be an effective biocide in mineral slurry applications, it is also believed to have use in oil field applications. These applications include

TABLE 3

| Chemistry | ppm | 1 day cfu/mL | 1 day Log Red | 3 day cfu/mL | 3 day Log Red | 7 day cfu/mL | 7 day Log Red | 14 day cfu/mL | 14 day Log Red |
|---|---|---|---|---|---|---|---|---|---|
| Control | | 250,000 | | 10,000 | | 27,000 | | 200,000 | CHALLENGE |
| 24% Thione | 500 | 3,300 | 2 | 100 | 2 | 100 | 2 | 100 | 3 |
| | 1000 | 100 | 3 | 100 | 2 | 100 | 2 | 100 | 3 |
| MDTCMA | 1000 | 100 | 3 | 100 | 2 | 100 | 2 | 100 | 3 |
| | 1500 | 100 | 3 | 100 | 2 | 100 | 2 | 100 | 3 |
| 42% SMDC | 1000 | 200 | 3 | 100 | 2 | 100 | 2 | 100 | 3 |
| | 1500 | 100 | 3 | 100 | 2 | 100 | 2 | 100 | 3 |
| 1.5% ISO/MDTCMA | 200/500 | 100 | 3 | 100 | 2 | 100 | 2 | 100 | 3 |
| 9% BIT/MDTCMA | 200/500 | 7,000 | 2 | 100 | 2 | 100 | 2 | 100 | 3 |
| 10%/BNPD/MDTCMA | 200/500 | 100 | 3 | 100 | 2 | 300 | 2 | 100 | 3 |
| 50% Glute/MDTCMA | 200/500 | 100 | 3 | 100 | 2 | 100 | 2 | 100 | 3 |
| 1.5% ISO/42% SMDC | 200/500 | 100 | 3 | 100 | 2 | 100 | 2 | 100 | 3 |
| 9% BIT/42% SMDC | 200/500 | 1,000 | 2 | 100 | 2 | 100 | 2 | 100 | 3 |
| 10%/BNPD/42% SMDC | 200/500 | 1,100 | 2 | 4,000 | 0 | 100 | 2 | 100 | 3 |
| 50% Glute/42% SMDC | 200/500 | 100 | 3 | 100 | 2 | 100 | 2 | 100 | 3 |

| Chemistry | ppm | 21 day cfu/mL | 21 day Log Red | 21 day Challenge cfu/mL | 21 day Challenge Log Red | 28 day cfu/mL | 28 day Log Red | 28 day Challenge cfu/mL | 28 day Challenge Log Red |
|---|---|---|---|---|---|---|---|---|---|
| Control | | 7,000 | | 20,210,000 | | 8400 | | 23,500,000 | |
| 24% Thione | 500 | 100 | 2 | 100 | 5 | 100 | 2 | 100 | 5 |
| | 1000 | 100 | 2 | 100 | 5 | 100 | 2 | 100 | 5 |
| MDTCMA | 1000 | 100 | 2 | 196,000 | 2 | 100 | 2 | 3,680,000 | 1 |
| | 1500 | 100 | 2 | 18,200 | 3 | 100 | 2 | 2,300,000 | 1 |
| 42% SMDC | 1000 | 100 | 2 | 384,000 | 2 | 100 | 2 | 3,000,000 | 1 |
| | 1500 | 100 | 2 | 100 | 5 | 100 | 2 | 100 | 5 |
| 1.5% ISO/MDTCMA | 200/500 | 100 | 2 | 424,000 | 2 | 100 | 2 | 4,000,000 | 1 |
| 9% BIT/MDTCMA | 200/500 | 100 | 2 | 31,400 | 3 | 100 | 2 | 3,400,000 | 1 |
| 10%/BNPD/MDTCMA | 200/500 | 100 | 2 | 471,000 | 2 | 100 | 2 | 2,800,000 | 1 |
| 50% Glute/MDTCMA | 200/500 | 100 | 2 | 500,000 | 2 | 100 | 2 | 2,500,000 | 1 |
| 1.5% ISO/42% SMDC | 200/500 | 100 | 2 | 600,000 | 2 | 100 | 2 | 2,600,000 | 1 |
| 9% BIT/42% SMDC | 200/500 | 100 | 2 | 67,000 | 2 | 100 | 2 | 4,000,000 | 1 |
| 10%/BNPD/42% SMDC | 200/500 | 100 | 2 | 500,000 | 2 | 100 | 2 | 3,500,000 | 1 |
| 50% Glute/42% SMDC | 200/500 | 100 | 2 | 392,000 | 2 | 100 | 2 | 3,000,000 | 1 |

Note:
All samples will be kept at 50 C. for the duration of the experiment to mimic process temperatures.
Day 20 - Samples split into two aliquots and one aliquot challenged with ~100,000 cfu/ml
Lowest sample dilution before plating was 1:100

In general, the results of the studies show that after inoculation, both levels of thione and the highest level of metam sodium were the most effective biocides. However, MDTCMA also was an effective biocide as well and could easily replace thione as a mineral slurry biocide. Replacing thione with either metam sodium or MDTCMA eliminates the drawbacks of odor and the presence of formaldehydes as oilfield drilling muds and workover or completion fluids; for control of slime-forming and/or spoilage bacteria and oilfield water treatment and water floods; for control of slime-forming and/or spoilage bacteria. Additional uses for the MDTCMA in the context of oil field applications include those applications discussed in the background art section above.

In these oil field applications, the MDTCMA would be used just like other biocides would be used in these applications. As these methods of use are well known, a detailed description of these methods is not necessary for understanding of the invention. As an example, the appropriate amount of MDTCMA would be used to get the desired concentration in a drilling fluid system being treated, e.g., so many gallons of a solution of MDTCMA per barrel of drilling fluid for example. The solution of MDTCMA can then be added to the fluid system where appropriate. For example, the solution could be added to a mud pit where drilling fluid is circulating. As the total volume increases, due to greater well depth, add additional biocide maintain the proper concentration. Because of the wide variation in drilling mud composition and bacterial contamination, greater or lesser amounts of the solution may be used. Examples of the waters or water systems needing biocide treatment in oil field operations include waste waters, drilling muds, workover or completion fluids, hydrolytic fracturing fluids, slickwater fracturing fluids and borate cross-linked guar fluids. While the concentration of MDTCMA is dependent on the water being treated, concentrations are based on laboratory testing but may range from 200 ppm to 4500 ppm with preferred ranges of 2500 ppm.

Metam sodium/potassium and MDTCMA can also be used as a biocide when treating one or more of adhesives, coatings, and high viscosity suspension, e.g., paper coatings, polymers and silica-polymer combinations as suspensions, polyvinyl alcohol/polyvinyl acetate-based adhesives, starch based adhesives, and dextrin-based adhesives. The treatment of these materials using metam sodium/potassium and MDTCMA can follow the same protocols that are used when thione is used as a biocide in these applications. Since these protocols are well known, a further description is not necessary for the understanding of the invention. The levels of concentration for these applications and determinations thereof are also expected to match the ranges set out above for mineral slurry applications. The effective amount can range from 200-4500 ppm weight based on the total formulation. An additional biocide can be used in connection with this application, these additional biocides including glutaraldehyde, tetrahydro-3-5-methyl-2H-1,3,5-thiadizine-2-thione, 2,2-dibromo-3nitrilopropionamide, bronopol, orthophenyl phenate, or tetra-kis-hydoxymethyly-phosphonium sulfate (THPS).

The mineral slurries using the metam sodium or MDTCMA can include other known additives such as surfactants, solubilizing agents, and the like that would be present in the slurries. Likewise, waters being treated in oil field applications or in conjunction with making coatings, adhesives, and high viscosity suspensions could also contain known additives.

As such, an invention has been disclosed in terms of preferred embodiments thereof which fulfills each and every one of the objects of the present invention as set forth above and provides a new and improved way to treat mineral slurries to inhibit bacterial growth by the use of one or both of sodium N-methyldithiocarbamate and methylammonium monomethyldithiocarbamate.

Of course, various changes, modifications and alterations from the teachings of the present invention may be contemplated by those skilled in the art without departing from the intended spirit and scope thereof It is intended that the present invention only be limited by the terms of the appended claims.

I claim:

1. A method of treating a mineral slurry comprising adding an effective amount of a biocide to the mineral slurry to inhibit bacterial growth, the biocide comprising of one or more of sodium or potassium N-methyldithiocarbamate and methylammonium monomethyldithiocarbarmate.

2. The method claim 1, wherein the effective amount further comprises 0.04-0.45% by weight based on the total formulation.

3. The method of claim 1, wherein the mineral slurry further comprises a slurry containing water and one or more of a starch, a clay, calcium carbonate, or titanium dioxide.

4. The method of claim 3, wherein the clay is a kaolin day and the calcium carbonate is a ground or precipitated calcium carbonate.

5. The method of claim 3, wherein the water is fresh water or reclaimed water.

6. The method of claim 1, further comprising adding an effective amount of an additional biocide selected from the group consisting of glutaraldehyde, 1,2 benzithiazolin-3-one, tetrahydro-3-5-methyl-2H-1,3,5-thiadizine-2-thione, isothiazoline, bronopol, 2,2-dibromo-3-nitrilopropionamide, or orthophenyl phenate.

7. A method of treating adhesives, coatings, and high viscosity suspensions comprising adding an effective amount of a biocide to the coatings, adhesives, and high viscosity suspensions to inhibit bacterial growth, the biocide comprising one or more of sodium or potassium N-methyldithiocarbamate and methylammonium monomethyldithiocarbamate.

8. The method claim 7, wherein the effective amount further comprises 200 -4500 ppm weight based on the total formulation.

9. The method of claim 7, further comprising adding an effective amount of an additional biocide to the one or more of the coatings, adhesives, and high viscosity suspensions, the biocide selected from the group consisting of glutaraldehyde, tetrahydro-3-5-methyl-2H-1,3,5-thiadizine-2-thione, 2,2-dibromo-3-nitrilopropionamide, bronopol, orthophenyl phenate, or tetra-kis-hydoxymethyly-phosphonium sulfate.

10. The method of claim 7, wherein the coatings comprise paper coatings.

11. The method of claim 7, wherein the adhesives comprise polyvinyl alcohol/polyvinyl acetate-based adhesives, starch based adhesives, and dextrin-based adhesives.

12. The method of claim 7, wherein the high viscosity suspensions comprise polymers and silica-polymer combinations.

* * * * *

UNITED STATES PATENT AND TRADEMARK OFFICE
CERTIFICATE OF CORRECTION

PATENT NO. : 9,695,071 B2
APPLICATION NO. : 15/205266
DATED : July 4, 2017
INVENTOR(S) : Spurlock It is certified that error appears in the above-identified patent and that said Letters Patent is hereby corrected as shown below:

Column 1, Line 12:
"methylammomonium" should read "methylammonium"

Column 1, Line 29:
"benzithiazolin" should read "benzisothiazolin"

Column 1, Line 30:
"thiadizine" should read "thiadiazine"

Column 1, Line 31:
"isothiazoline" should read "isothiazolin"

Column 1, Line 32:
"nitrilopropionarnide" should read "nitrilopropionamide"

Column 1, Line 35:
"3243which" should read "3243 which"

Column 1, Line 58:
"VOC's" should read "VOCs"

Column 2, Line 36:
"benzithiazolin" should read "benzisothiazolin"

Column 2, Line 37:
"thiadizine" should read "thiadiazine"
"isothiazoline" should read "isothiazolin"

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)

Column 2, Line 63:
"comprising" should be deleted

Column 3, Line 4:
"thiadizine" should read "thiadiazine"

Column 3, Line 6:
"hydoxymethyly" should read "hydroxymethyl"

Column 3, Line 34:
"these" should read "the"

Column 3, Line 46:
"up to" should be deleted

Column 4, Line 1:
"mariner" should read "manner"

Column 4, Line 11:
"shiny" should read "slurry"

Column 4, Line 18:
"benzithiazolin-3 -one" should read "benzisothiazolin-3-one"

Column 4, Line 19:
"thiadizine" should read "thiadiazine"
"isothiazoline" should read "isothiazolin"

Column 4, Line 31:
"zithiazolin" should read "zisothiazolin"

Column 4, Line 32:
"thiadizine" should read "thiadiazine"
"isothiazoline" should read "isothiazolin"

Column 4, Line 59:
"effected" should read "affected"

Column 6, Line 15:
"is the best performer in Table 2, this Table also that either" should read "is the best performer in Table 2, this Table also shows that either"

Column 7, Line 6:
"testing), the SDMC and MDTCMA performed on a par" should read "testing), the SDMC and MDTCMA performed on par"

CERTIFICATE OF CORRECTION (continued)

Column 7, Line 10:
"superior biocide as between SDMC and MDTCMA." should read "superior biocide between SDMC and MDTCMA."

Column 9, Line 13:
"due to greater well depth, add additional biocide maintain" should read "due to greater well depth, add additional biocide to maintain"

Column 9, Line 40:
"3nitrilopropionamide" should read "3-nitrilopropionamide"

Column 9, Line 41:
"tetra-kis-hydoxymethyly" should read "tetrakis-hydroxymethyl"

Column 10, Line 13:
"monomethyldithiocarbarmate" should read "monomethyldithiocarbamate"

Column 10, Line 20:
"kaolin day" should read "kaolin clay"

Column 10, Line 27:
"benzithiazolin" should read "benzisothiazolin"

Column 10, Line 28:
"thiadizine" should read "thiadiazine"

Column 10, Line 29:
"isothiazoline" should read "isothiazolin"

Column 10, Line 44:
"thiadizine" should read "thiadiazine"

Column 10, Line 46:
"tetra-kis-hydoxymethyly" should read "tetrakis-hydroxymethyl"